Jan. 20, 1953 M. L. CLABAUGH 2,626,057
OIL FILTER FOR DIESEL LOCOMOTIVE ENGINES
Filed Feb. 7, 1949 2 SHEETS—SHEET 2
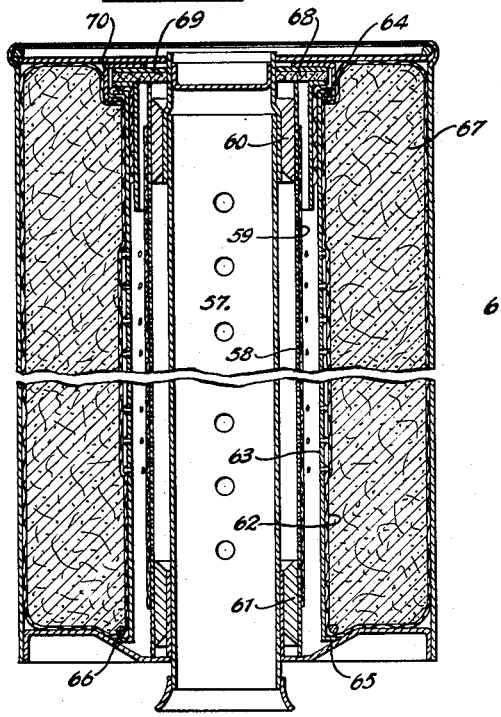
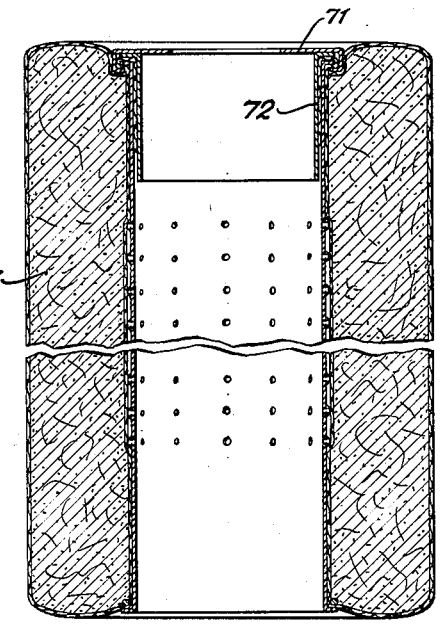
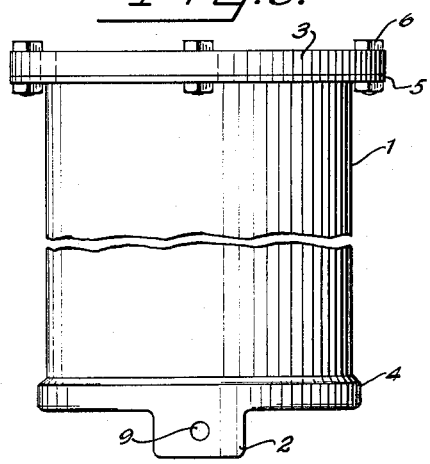
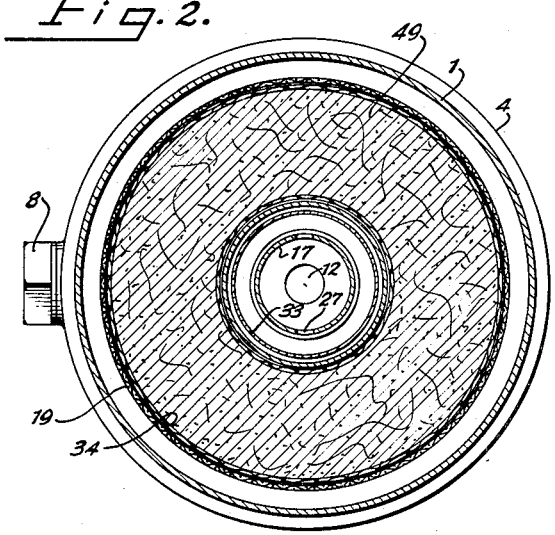
Inventor
MILFORD L. CLABAUGH.
By Shoemaker & Mattare
ATTORNEY Patented Jan. 20, 1953

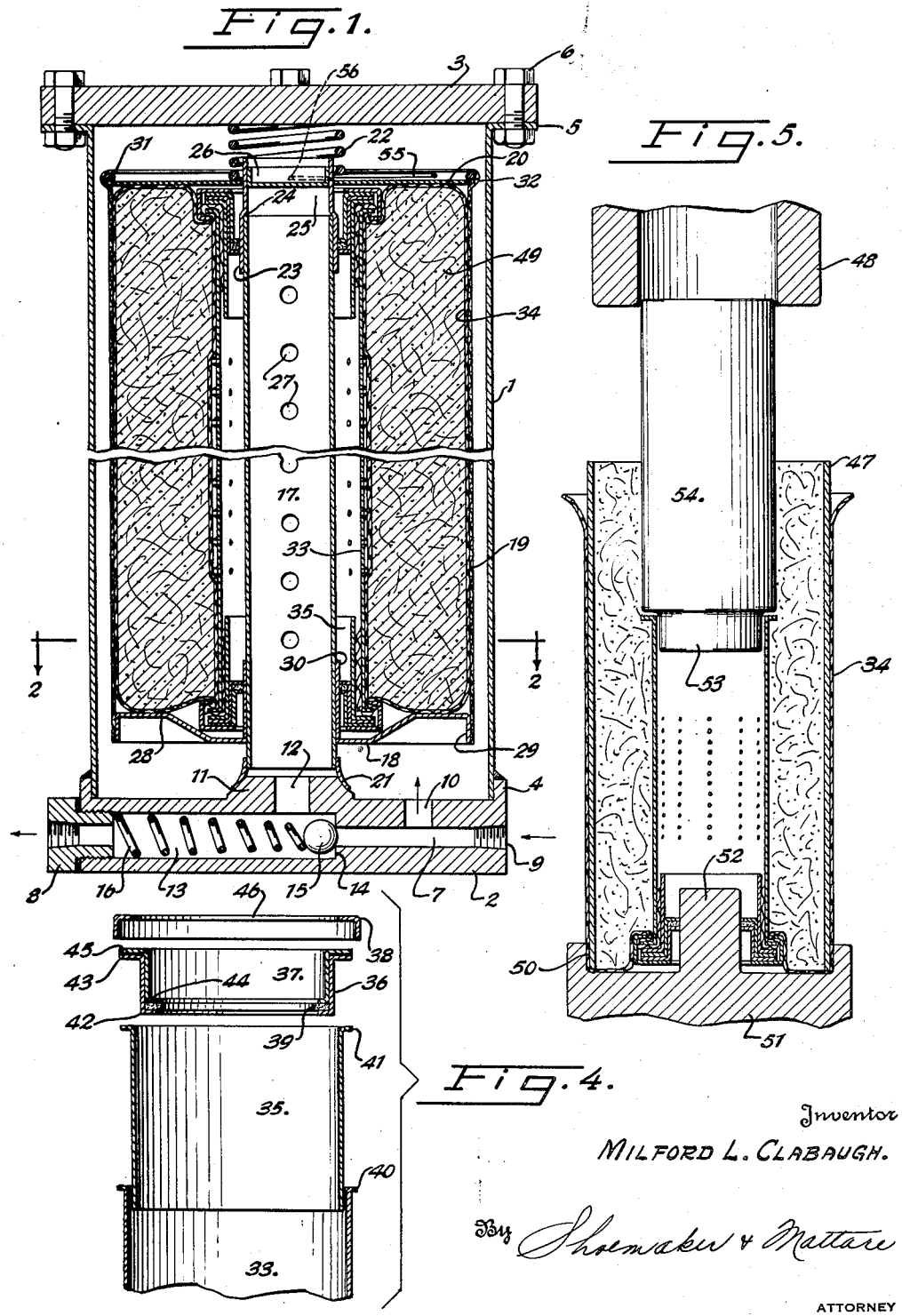

2,626,057

UNITED STATES PATENT OFFICE 2,626,057

OIL FILTER FOR DIESEL LOCOMOTIVE ENGINES

Milford L. Clabaugh, Gastonia, N. C., assignor to Wix Accessories Corporation, Gastonia, N. C., a corporation of North Carolina Application February 7, 1949, Serial No. 74,883

5 Claims. (Cl. 210—148)

An object of the present invention is to improve the construction of oil filter units for diesel engines and the like and to provide a simple, practical and efficient filter replacement unit for filters for diesel locomotive engines, of comparatively inexpensive construction and adapted to be readily removed and replaced by a new or unused filter unit when necessary or desirable.

Heretofore these engines have been equipped with filters having filter elements of the "crush" type and dependent on pressure between the end plates of the basket and the gaskets of the filter element of replacement unit to prevent dirty oil by-passing the filtering medium. In actual practice, however, this old type of filter element, due to its extreme size, would settle down owing to vibration after becoming soaked with oil. This settling would leave a gap between the top of the filter element and the top plate of the filter basket, allowing the dirty oil to by-pass into the center tube of the basket without being filtered.

It is an object of the invention to overcome these objections and provide a filter replacement unit having a fibrous filter element with a seal independent of the sealing of the sock of the filter element against the end plates of the basket.

A further object of the invention is to provide a filter replacement unit having permanently mounted gaskets constituting portions of and carried by the unit and capable of affording an efficient seal and preventing dirty oil from by-passing the filter element should the latter sag and leave an intervening space between the filtering element and the top end plate of the basket.

Another object of the invention is to provide a removable basket assembly including a perforated basket tube provided at its lower end with a joint connection with the base assembly of the filter casing maintained in tight connection with the base of the casing by a spring which holds the top plate or cover of the basket in sealing engagement with the filter element of the replacement unit.

Another object of the invention is to provide an oil filter equipped at the base with a large by-pass valve which opens at a predetermined pressure so that the pump will continue to supply the bearings with oil after the resistance of the filter element has increased to the point that the bearings would not receive sufficient oil if the by-pass valve were not provided, so that a portion of the oil will go through the by-pass valve directly to the bearings and the remainder will be diverted upwardly to the filter element and then through the filter element to the bearings along with the unfiltered oil, whereby proper lubrication of the bearings will be maintained under all pressure conditions.

A further object of the invention is to provide a filter replacement unit in which the fabric sock containing the filtering medium will cover the perforated center tube of the replacement unit to prevent any of the filtering medium migrating through the perforations of the center tube to the clean side of the filter and also to enable such result to be brought about with a fabric filter sock consisting of a single piece of woven fabric having a portion thereof covering the perforated center tube, or a separate piece of fabric sock covering the center tube.

A further object of the invention is to provide an oil filter having a fine screen assembly arranged within the basket and interposed between the perforated center tube of the filter replacement unit and the basket tube without interfering with ready placement of the filter replacement unit within the basket and its removal therefrom.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a central vertical sectional view of an oil filter having a basket, a base assembly and a filter replacement unit constructed in accordance with the present invention;

Fig. 2 is a horizontal sectional view taken on the line 2—2 of Fig. 1;

Fig. 3 is an elevation of the filter on a reduced scale;

Fig. 4 is an exploded view showing the gasket cup assembly, sock retainer and a portion of the center tube of the filter replacement unit;

Fig. 5 is a central vertical sectional view of a mold, and illustrating the manner of compressing the filtering medium within the fabric sock to form the filter element;

Fig. 6 is a central vertical sectional view of a filter replacement unit arranged within a basket having a fine screen assembly;

Fig. 7 is a central vertical sectional view of a slight modification of the form of the invention illustrated in Fig. 6 with the top gasket and gasket plate omitted.

Referring particularly to the form of the invention illustrated in Figs. 1 to 4, inclusive, the oil filter casing comprises in its construction a cylindrical body portion 1, a base 2 and a top or cover 3. The base, which is circular to conform to the configuration of the cylinder, is provided with an upwardly extending flange 4 which receives and surrounds the lower end of the cylindrical body and is secured to the same by any suitable means such as spot welding or the like. The cylindrical body is provided at its upper end with an outwardly extending horizontal peripheral flange 5 and the top or cover 3, which is arranged upon the flange 5, is secured to the same by bolts 6 arranged at intervals, as clearly illustrated in Fig. 1 of the drawings.

The base 2 is provided with a transverse passage 7 interiorly threaded at one end for connection with an oil pump and interiorly threaded at the other end to receive a main outlet nipple 8 for connection with the bearings to be lubricated. The base is provided adjacent the main inlet end 9 of the passage with an inlet opening 10 communicating with the interior of the casing and the central portion of the base is provided with an upwardly extending tapered enlargement or boss 11 having an outlet opening 12. The transverse passage is counter-bored to provide an enlargement 13 thereof extending from the nipple receiving end of the passage to a point beyond the outlet opening 12 and forming a shoulder or seat 14 located at a point intermediate of the inlet opening 10 and the outlet opening 12 and controlled by a by-pass ball valve 15, but any other suitable form of valve may, of course, be employed. A coil expansion spring 16 is interposed between the by-pass valve and the nipple for maintaining the by-pass valve closed until pressure at the inlet end of the transverse passage builds up sufficiently to overcome the spring and open the by-pass valve and permit a portion of the unfiltered oil to pass to the bearings for lubricating the same when the condition of the filter would otherwise prevent oil from passing through the filter and out through the outlet opening 12 to the bearings.

In operation, a portion of the oil from the oil pump will go through the by-pass directly to the bearings and the remainder will be diverted up through the filter and then to the bearings along with the unfiltered oil. The pressure available for filtration is, therefore, only the differential in pressure on both sides of the by-pass. Because this differential in pressure cannot exceed a certain amount it is necessary to have a very high capacity filter to insure adequate life.

The filter replacement unit is arranged within a basket or basket assembly comprising a center basket tube 17, a bottom plate 18, a perforated cylindrical shell 19 and a cover 20. The casing 1 forms an unobstructed cylindrical chamber for the reception of the basket or basket assembly and the filter replacement unit which is carried by the basket assembly and which is introduced into and removed from the filter by said assembly. The basket tube 17 is provided with a flaring lower end 21 which may be formed by a separate piece, as clearly indicated in Fig. 1 of the drawings and which conforms closely to the configuration of the tapered boss 11 to provide an oil tight bottom joint between the base of the filter casing and the lower end of the basket tube.

The joint between the lower end of the basket tube and the base is maintained oil-tight by means of a relatively heavy coil spring 22 surrounding the upper end of the basket tube 17 and interposed between the top 3 of the casing and the cover 20 of the basket. The basket tube 17 is provided at its upper end with a tubular extension 23 fitted on the upper end of the basket tube and extending through a central opening in the cover 20 and reduced diametrically at the upper end of the body portion of the basket tube 17 to provide a shoulder 24 for engaging the upper edge of said body portion of the basket tube. The tubular extension at the upper end of the basket tube is provided with a horizontal wall 25 consisting of a disk having an upwardly extending annular flange 26 which is suitably secured to the tubular extension 23 interiorly thereof at a point slightly below the upper end of said extension 23. The basket tube 17 is provided at intervals with openings 27 through which oil from the clean side of the filter passes into the basket tube to the outlet 12. The bottom plate 18 is dished-in at its lower face at 28 to form an elevated filter unit support and is provided at its periphery with a depending annular flange 29 telescopically fitted within and suitably secured to the perforated shell 19 at the lower end thereof. The bottom plate 18, which has a central opening to receive the basket tube 17 is provided thereat with an upwardly extending tubular portion 30 which is telescopically fitted on and suitably secured to the basket tube 17 adjacent the lower end thereof. The cover 20 of the basket is detachably confined within the outer shell by a snap ring 31 arranged upon the upper face of the cover and engaging an interior annular groove formed in the perforated shell 19 at the upper end thereof by an exterior bead 32. This arrangement of the cover or top plate 20 enables it to be maintained in pressure engagement with the top of the filter unit by the spring 22 which also maintains a tight joint at the lower end of the base 2.

The cover 20 and the top of the filter casing are adapted to be readily removed to permit the assembly of the filter replacement unit and also for enabling the filter replacement to be readily removed from the filter when necessary or desirable. The filter replacement unit comprises in its construction a perforated central tube 33, a fabric sock 34, sock retainers 35 and gasket cup assemblies comprising an outer cylindrical cup 36, an inner cylindrical cup 37, a closure cap 38 and a gasket 39. The perforated center tube 33 is provided at its upper and lower ends with outwardly extending annular flanges 40 and the sock retainer 35, which is thin and tubular or cylindrical, is provided at its outer end with an outwardly extending annular flange 41. The gasket 39 is arranged upon the bottom 42 of the outer cylindrical cup which is provided with an opening to receive the basket tube and the said gasket projects inwardly beyond the edge of the bottom and fits against the basket tube to form an oil-tight seal. The outer cylindrical cup is provided at its outer or open end with an outwardly extending annular flange 43 which is arranged upon or seated against the flange 41 of the sock retainer 35. The inner cylindrical cup, which is of the same configuration as the outer cylindrical cup, fits snugly within the latter and is provided with a bottom 44 which fits against the outer face of the gasket 39. The open or outer end of the inner cylindrical cup is provided with an outwardly extending annular flange 45 which extends over the outwardly extending flange of the outer cylindrical cup.

The closure cap 38, which is annular, defines a central basket tube receiving opening 46 and is provided with an inwardly extending annular peripheral flange which is initially cylindrical and which is crimped around the flange 40 of the perforated center tube 33 for rigidly securing the gasket cup assembly and the sock retainer to the end of the perforated center tube 33. The gasket cup assembly is thereby made an integral or inseparable part of the filter replacement unit.

In Fig. 1 of the drawings the fabric sock covers the outer face of the center tube 33 which is provided with out-pricked perforations, and one end of the sock is tucked into the upper end of the center tube. At the other end of the center tube the sock is doubled and tucked into the tube and the long sock retainer is then pushed into this end of the tube, confining the doubled-over portion of the sock within the end of the center tube between the same and the retainer. The gasket cup assembly is then inserted into the sock retainer, after which the closure cap is placed over the inner and outer cups and is crimped around the flanged end of the center tube.

The free portion of the sock is then slipped over a mold cylinder 47 and fibrous material is then compressed between the perforated center tube and the mold cylinder by a cylindrical ram 48 to form a filter element 49. The lower end of the center tube is anchored in a recess 50 of the base 51 of the mold by a lower projection 52 which is of a diameter to fit the opening in the gasket 39, and the upper end of the perforated tube is braced by the reduced end 53 of a cylindrical plug 54 over which the cylindrical ram 48 slides. After the mass of fibrous material is compressed into a filter unit, the center tube, the filter element and the sock are removed from the mold and the open end of the sock is closed over the filter element and is tucked into the upper end of the center tube. The long sock retainer is then inserted into the upper end of the center tube and the tucked-in ends of the sock are confined between the sock retainer and the center tube. The sock retainer, which is tubular, is elongated and extended beyond the cut ends of the sock material to prevent the material sloughing off the cut ends of the sock and passing on to the engine oiling system where they would tend to clog small oil passages. For this reason the extra long sock retainer is used instead of employing for this purpose the outer gasket retainer cup for securing the tucked-in ends of the sock to the inner tube. Instead of employing a single continuous piece of sock material a separate piece may be employed for covering the center tube and the ends of the sock may be tucked into the ends of the center tube. As this is obvious, it is believed that illustration thereof is unnecessary.

A handle 55 of approximately U-shape may be employed for enabling the basket and the filter replacement unit to be readily removed from the casing. The handle 55, which is adapted to lie in a horizontal position within the upper end of the shell, as clearly shown in Fig. 1 of the drawings, has its ends 56 snapped into perforations in the upper end of the basket tube.

In Fig. 6 of the drawings is illustrated a form of the invention in which a fine screen assembly is interposed between the basket tube 57 and the filter replacement unit, in spaced relation with the same, to provide an intervening space between the fine screen assembly and the filter replacement unit and also between the fine screen assembly and the basket tube 57. The fine screen assembly comprises a perforated tube 58 and a fine screen 59 which is arranged upon and supported by the perforated tube 58, and said tube 58 is spaced from the basket tube by upper and lower sleeves 60 and 61 which close the space between the basket tube and the fine screen assembly at the upper and lower ends thereof.

In forming the filter replacement unit, one end of the fabric sock 62 is tucked into the upper end of the perforated center tube 63 which is provided with upper and lower outwardly extending annular flanges 64 and 65. The sock is then stretched along the exterior of the center tube to cover the same and it is secured intermediate of its ends to the lower end of the center tube by means of a wire retaining element 66 which encircles the fabric sock and the center tube and is supported upon the lower flange 65 thereof but any other suitable means may, of course, be provided for securing the sock to the lower end of the center tube. The fabric sock is then filled with fibrous material and is compressed to form a filter element 67, in the manner before described.

The open end of the sock is closed over the filter element 67 and is tucked into the upper end of the center tube and the elongated sock retainer 72 is then inserted within the tucked-in ends of the sock to confine them in the upper end of the center tube.

The filter replacement unit thus formed is annular and the center tube is of a diameter sufficient to enable it to readily pass over the fine screen assembly.

A gasket 68 is then arranged upon the upper end of the perforated tube 59 and a gasket plate 69 is placed upon the gasket 68. A closure cap 70 is then placed in position on the gasket plate and is crimped around the upper flange of the center tube, securely fastening the gasket and gasket plate in position and thereby sealing the upper end of the space between the fine screen assembly and the center tube and also the space between the fine screen assembly and the basket tube.

In Fig. 7 of the drawings is illustrated a slight modification of the form of the invention shown in Fig. 6. The parts are the same with the exception that the gasket 68 and the gasket plate 69 are omitted and the top plate will engage the upper end of the filter element 67. The gasket retainer is secured to the upper end of the center tube by means of a closure cap 71 arranged upon the sock retainer and crimped around the flange of the upper end of the center tube. This type of filter replacement unit is suitable for use in a basket either with or without the fine screen assembly and the sealing of the filter element will depend upon pressure between the basket end plates and the ends of the filter element. This construction has been found satisfactory where the filters are mounted horizontally because in a horizontal mounting there is no danger of the filter element collapsing lengthwise and destroying the seals.

What I claim is:

1. An oil filter including a filter replacement unit comprising a perforated center tube, a fabric sock tucked into the center tube, a thin cylindrical sock retainer of uniform diameter throughout its entire length and arranged within the center tube and confining the tucked sock between it and the center tube and elongated and extending inwardly beyond the socket and preventing material of the sock sloughing off and passing on to an engine oiling system, and a gasket cup assembly including an outer cylindrical cup arranged within the sock retainer, a gasket supported within the outer cup, an inner cylindrical cup arranged within the outer cylindrical cup and engaging the gasket, and a closure cap fitted over said cups and having a flange crimped around the center tube and permanently securing the gasket cup assembly to the center tube so that said assembly will constitute an inseparable portion of the filter replacement unit.

2. An oil filter including a filter replacement unit comprising a center tube provided at its ends with outwardly projecting flanges, a fabric sock tucked into the ends of the tube, thin cylindrical sock retainers of uniform diameter throughout their entire length provided at their outer ends with outwardly extending flanges and fitted within the ends of the center tube and confining the fabric sock between them and the center tube and elongated and extending inwardly beyond the sock and preventing material of the sock from sloughing off and passing into an engine oiling system, gasket assemblies comprising outer cylindrical cups fitted within the sock retainers and provided with outwardly extending flanges arranged upon the flanges of the sock retainers, gaskets supported within the outer cups, inner cylindrical cups fitted within the outer cups and engaging the gaskets and provided with outwardly extending flanges arranged upon the flanges of the outer cups, and closure caps arranged on the inner cups and having flanges crimped around the flanges of the center tube and positively securing the gasket cup assemblies to the center tube so that said assemblies will constitute permanent portions of the filter replacement unit.

3. An oil filter comprising a casing defining an unobstructed chamber and having a removable top and a base, the base being formed with a continuous passage having opposite ends open and adapted for connection with an oil pump and a circulating pipe, the base being also formed with ports extending upwardly from said passage and constituting an oil inlet opening for the chamber and an oil outlet opening, a check valve in said passage between said ports yieldably held closed and opening toward the outlet end of the passage when subjected to predetermined pressure of incoming oil, an upstanding boss on the base surrounding the outlet opening and tapered upwardly, a basket assembly in said chamber including a perforated shell, top and bottom heads having marginal portions secured to said shell, a perforated center tube extending vertically in said basket with end portions passing through said heads and protruding therefrom, said tube having a flared lower end fitting snugly about the boss of said base and forming a tight joint between the center tube and the base, a closure for the upper end of said center tube, a perforated cylindrical inner wall for said basket surrounding said center tube in spaced concentric relation thereto, outstanding flanges about ends of said inner wall, a sock in said basket filled with filtering material and having end portions folded across end flanges of the inner wall and tucked into end portions of the inner wall, tubular sock retainers fitting within ends of said inner wall and each having an outstandnig flange about its outer end overlying the flange of the inner wall and together therewith gripping the inturned sock, said retainers extending into end portions of the inner wall beyond the inturned portions of the sock and preventing material of the sock sloughing off, an outer cylindrical cup fitting snugly in each sock retainer and having an inwardly projecting flange about its inner end, a gasket in each outer cup and resting against the inner flange thereof, an inner cup in each outer cup having an inwardly projecting flange about its inner end, the gaskets being gripped between the inner flanges of the companion inner and outer cups and fitting snugly about the center tube and thereby forming tight joints, closure caps for outer ends of said cups fitting about end portions of said center tube and having peripheral flanges extending longitudinally of the inner wall beyond the flanged ends thereof and holding portions of the sock closely about the flanged ends of the inner wall, and a spring about the protruding upper end of the center tube confined between the top of the casing and the upper head of the casing and urging the casing downwardly and holding the flared end of the center tube in close fitting engagement with the boss of the base.

4. An oil filter comprising a casing defining a chamber and having a top and a base, the base being provided with an inlet for dirty oil communicating with the chamber and also provided with an outlet for filtered oil leading from the chamber, a basket assembly having a perforated shell and a removable head at its top and bottom, a perforated center tube extending vertically in the basket assembly and having its lower end passing through the bottom and bearing against the base about the outlet opening, a spring urging the basket downwardly and holding the lower end of the tube in engagement with the base about the outlet opening, a closure for the upper end of said tube, a perforated cylindrical wall for said basket surrounding said tube in spaced relation thereto, a sock in said basket filled with filtering material and having end portions tucked into end portions of said inner wall, and securing means for the tucked in portions of said sock each consisting of a tubular sleeve fitting snugly into the inner wall and having an outstanding flange about its outer end extending across the end edge of the companion end of the inner wall and gripping the sock, said sleeve extending into the inner wall beyond the tucked in portion of the sock and preventing material of the sock sloughing off and moving toward the outlet with filtered oil, a cup removably fitted into said sleeve through the outer end thereof, an inner cup removably fitted into the first cup through the outer end thereof, said cups having inwardly projecting flanges about their inner ends, a gasket between the flanges of the cups having marginal portions projecting laterally therefrom and fitting tightly about said center tube and forming a tight joint, outstanding flanges about outer ends of said cups projecting across the upper edge of the center tube, and a cap resting against the outer flange of the inner cup and having a depending marginal flange engaging portions of the sock and holding the same tightly about the inner wall.

5. An oil filter comprising a casing having a bottom formed with an inlet for dirty oil and an outlet for filtered oil, a perforated center tube disposed vertically in said casing and having its lower end resting upon the bottom about said outlet and its upper end closed, a basket assembly about said center tube having a cylindrical perforated shell and top and bottom heads formed with openings through which upper and lower portions of the center tube pass, a perforated inner tubular wall for the basket disposed vertically about the center tube in spaced concentric relation thereto, a sock in said basket filled with filtering material and having end portions tucked into ends of the inner wall, and securing means for a tucked-in end portion of the sock consisting of a tubular sock-gripping sleeve fitting snugly within said inner wall and extending longitudinally in the center wall beyond the tucked-in portion of the sock and preventing material sloughing off from the sock and moving toward the outlet with filtered oil, a cup fitting snugly in said sleeve and having a flange about its outer end overlapping the outer end of the sleeve, a gasket in said cup fitting tightly about said center tube, an annular member fitting snugly in said cup and having clamping engagement with the gasket, and an annular cap engaged about the flange of the cup and the adjoining end of the inner wall and gripping a portion of the sock.

MILFORD L. CLABAUGH.

REFERENCES CITED

The following references are of record in the file of this patent:

UNITED STATES PATENTS

| Number | Name | Date |
|---|---|---|
| 1,901,484 | Winslow, et al. | Mar. 14, 1933 |
| 2,070,039 | Briggs | Feb. 9, 1937 |
| 2,108,798 | Dalrymple | Feb. 22, 1938 |
| 2,158,512 | Layte, et al. | May 16, 1939 |
| 2,212,647 | Nugent | Aug. 27, 1940 |
| 2,294,262 | Wilkinson | Aug. 25, 1942 |
| 2,334,664 | Wicks | Nov. 16, 1943 |
| 2,367,745 | Wicks | Jan. 23, 1945 |
| 2,390,539 | Katcher | Dec. 11, 1945 |
| 2,453,405 | Bolser | Nov. 9, 1948 |
| 2,543,481 | Wicks, et al. | Feb. 27, 1951 |